United States Patent
Takahashi et al.

(10) Patent No.: US 8,666,636 B2
(45) Date of Patent: Mar. 4, 2014

(54) CONTROL APPARATUS FOR INTERNAL COMBUSTION ENGINE WITH SUPERCHARGER

(75) Inventors: Kiyonori Takahashi, Susono (JP); Shinichi Soejima, Gotenba (JP); Satoru Tanaka, Susono (JP); Satoshi Yoshizaki, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/519,240

(22) PCT Filed: Jan. 14, 2011

(86) PCT No.: PCT/JP2011/050538
§ 371 (c)(1),
(2), (4) Date: Jun. 26, 2012

(87) PCT Pub. No.: WO2012/095988
PCT Pub. Date: Jul. 19, 2012

(65) Prior Publication Data
US 2013/0282259 A1  Oct. 24, 2013

(51) Int. Cl.
*F02D 23/00* (2006.01)

(52) U.S. Cl.
USPC ............ 701/103; 123/559.1; 123/564

(58) Field of Classification Search
USPC ........... 701/100, 102–106, 115; 123/3, 336, 123/337, 350, 478–480, 559.1–559.3, 123/561–564; 60/278, 280, 285, 301, 600, 60/601
See application file for complete search history.

(56) References Cited

U.S. PATENT DOCUMENTS

| | | | |
|---|---|---|---|
| 7,082,932 B1 * | 8/2006 | Crane | 123/559.1 |
| 7,597,088 B2 * | 10/2009 | Tally | 123/559.1 |
| 8,051,835 B2 * | 11/2011 | Soejima et al. | 123/406.45 |
| 8,469,000 B2 * | 6/2013 | Ouwenga et al. | 123/337 |
| 2006/0196182 A1 | 9/2006 | Kimoto et al. | |
| 2006/0207252 A1 | 9/2006 | Isobe et al. | |
| 2007/0051348 A1 * | 3/2007 | Hundekar | 123/559.1 |
| 2007/0175456 A1 * | 8/2007 | Tally | 123/559.1 |
| 2008/0109145 A1 | 5/2008 | Eiraku | |
| 2009/0228187 A1 * | 9/2009 | Nakamura | 701/103 |
| 2011/0082629 A1 | 4/2011 | Soejima et al. | |
| 2011/0137514 A1 | 6/2011 | Itabashi | |

FOREIGN PATENT DOCUMENTS

| | | |
|---|---|---|
| JP | A-06-323148 | 11/1994 |
| JP | A-2002-221068 | 8/2002 |
| JP | A-2004-197653 | 7/2004 |
| JP | A-2006-242062 | 9/2006 |

(Continued)

*Primary Examiner* — John T. Kwon
*Assistant Examiner* — Johnny Hoang
(74) *Attorney, Agent, or Firm* — Oliff PLC

(57) ABSTRACT

A control apparatus for a supercharged internal combustion engine, which can achieve a target torque accurately even if the target torque contains a high-frequency vibration component. The control apparatus determines a target air quantity and a target boost pressure from a target torque, operates an actuator for air quantity control according to the target air quantity, and operates an actuator for boost pressure control according to the target boost pressure. The target torque is formed to contain a low-frequency torque component that is set at all times based on a torque requirement from a driver and a high-frequency torque component that is set as necessary for a specific type of vehicle control. When the target torque contains only the low-frequency torque component, the target boost pressure is formed using a pressure component corresponding to the low-frequency torque.

9 Claims, 9 Drawing Sheets

(56) References Cited

FOREIGN PATENT DOCUMENTS

| | | |
|---|---|---|
| JP | A-2006-242065 | 9/2006 |
| JP | A-2007-046502 | 2/2007 |
| JP | A-2007-056697 | 3/2007 |
| JP | A-2007-198157 | 8/2007 |
| JP | A-2010-144581 | 7/2010 |
| JP | A-2010-173477 | 8/2010 |
| JP | A-2010-216305 | 9/2010 |
| WO | WO 2010/050069 A1 | 5/2010 |
| WO | WO 2010/084611 A1 | 7/2010 |

* cited by examiner

CONTROL APPARATUS FOR INTERNAL COMBUSTION ENGINE WITH SUPERCHARGER

TECHNICAL FIELD

The present invention relates, in general, to control apparatuses for internal combustion engines having superchargers and, in particular, to a control apparatus for an internal combustion engine with a supercharger capable of actively controlling a boost pressure as well as an air quantity according to a target torque.

BACKGROUND ART

As one method for controlling an internal combustion engine, torque demand control is known that uses torque as a control amount for determining an operation amount of each of different actuators. A target torque that serves as a target value of a control amount is determined based on a torque requirement from a driver, which may be estimated from an accelerator pedal operation, or a torque requirement from a vehicle control device such as a VSC and a TRC. With an internal combustion engine having an established target air-fuel ratio, such as a gasoline engine, a target air quantity is determined from the target torque and a specific actuator for controlling the air quantity is operated according to the target air quantity.

The torque demand control described above may be applied to an internal combustion engine having a turbocharger or a mechanical supercharger. Some such supercharged internal combustion engines can actively control a boost pressure. For example, an internal combustion engine disclosed in JP-A-2006-242062 includes a turbocharger with an electric motor. Active control of the boost pressure is enabled by letting the electric motor assist in rotation of a compressor. An internal combustion engine disclosed JP-A-2007-056697 includes a turbocharger with a waste gate valve, in which the active control of the boost pressure is enabled by operating the waste gate valve to thereby increase or decrease a flow rate of an exhaust gas flowing into a turbine. Alternatively, the boost pressure may be actively controlled using an air bypass valve or a variable nozzle in a turbine. In the torque demand control performed in the internal combustion engine capable of such a boost pressure control, a target air quantity and a target boost pressure are determined from the target torque and the actuator for controlling the boost pressure is operated according to the target boost pressure, as disclosed, for example, in JP-A-2006-242062. To determine the target boost pressure from the target torque, a map may be used that represents measurements taken of boost pressures required for achieving different torque values variable according to different operating conditions.

As a method of vehicle control, a method for damping vehicle body sprung vibration or, in particular, pitching vibration through torque control for the internal combustion engine is known. The torque control for the internal combustion engine for this specific purpose will hereinafter be referred to as vehicle vibration damping control. In the vehicle vibration damping control, pitching vibration according to a current driving force is obtained from a vehicle body vibration model and high-frequency torque to cancel the pitching vibration is calculated. This damping high-frequency torque component is added to low-frequency torque calculated based on an accelerator pedal operation amount. A sum of the high-frequency torque component and the low-frequency torque component is then set as a target torque to thereby perform the torque control for the internal combustion engine.

For the vehicle vibration damping control in the internal combustion engine capable of controlling the boost pressure, a target boost pressure is determined based on the target torque that contains the high-frequency torque component for damping purpose. Since the high-frequency torque component contained in the target torque is directly reflected in the target boost pressure, the target boost pressure for performing the vehicle vibration damping control contains a high-frequency pressure component. In this case, an actuator for controlling the boost pressure is operated such that the boost pressure is vibrationally varied according to the target boost pressure containing the high-frequency pressure component.

A response lag, however, exists in an actual boost pressure relative to the operation of the actuator. The lag time in response involved herein is not so small as to be negligible as compared with a cycle of vibration in the vehicle vibration damping control. As a result, a phase shift that is not negligible occurs between the target boost pressure and the actual boost pressure as shown in the lower graph of FIG. 15. The phase shift between the target boost pressure and the actual boost pressure creates a situation in which the actual boost pressure is lower than the target boost pressure, specifically, the boost pressure is insufficient. In throttle operation based on the target air quantity, a throttle opening required for achieving the target air quantity is calculated based on the actual boost pressure. In this case, if the actual boost pressure is higher than the target boost pressure, the target air quantity can be achieved by reducing the throttle; however, if the actual boost pressure falls short of the target boost pressure, the target air quantity cannot be achieved by simply adjusting the throttle opening. This is because of the reason that a maximum value of the quantity of air to be drawn into a cylinder depends on the actual boost pressure and, and if the actual boost pressure falls short of the target boost pressure, the maximum air quantity becomes smaller than the target air quantity. As shown in the upper graph of FIG. 15, therefore, torque to be actually achieved yields a waveform different from a waveform of the target torque, so that it becomes impossible to give vibration required for damping the vehicle to the torque.

As described above, in the supercharged internal combustion engine including a boost pressure control actuator, such as a waste gate valve, the boost pressure can be actively controlled according to the target torque. Because of the response lag involved between the target boost pressure and the actual boost pressure, however, if target torque contains a high-frequency vibration component, the target torque may not be accurately achieved.

PRIOR ART DOCUMENTS

Patent Documents

Patent Document 1
JP-A-2006-242062
Patent Document 2
JP-A-2007-046502
Patent Document 3
JP-A-2007-198157
Patent Document 4
JP-A-2007-056697
Patent Document 5
JP-A-2002-221068
Patent Document 6
JP-A-2006-242065

SUMMARY OF THE INVENTION

Problem to be Solved by the Invention

An object of the present invention is to achieve, in a supercharged internal combustion engine, a target torque accurately even if the target torque contains a high-frequency vibration component. To achieve the foregoing object, the present invention provides a control apparatus for a supercharged internal combustion engine as detailed in the following.

The present invention provides a control apparatus that determines a target torque based on various types of torque requirements including a torque requirement from a driver and a torque requirement from a vehicle control element. The target torque determined by the control apparatus includes a low-frequency torque component and a high-frequency torque component. The low-frequency torque component is set at all times based on the torque requirement from the driver. The high-frequency torque component is set as necessary for a specific type of vehicle control represented by vehicle sprung vibration-damping control. This control apparatus determines a target air quantity and a target boost pressure from the target torque, thereby operating an actuator for air quantity control according to the target air quantity and an actuator for boost pressure control according to the target boost pressure.

The control apparatus provided by the present invention is characterized firstly by a process of determining the target boost pressure from the target torque. In the control apparatus according to an embodiment of the present invention, when the target torque contains only the low-frequency torque component, the control apparatus forms the target boost pressure by using a pressure component corresponding to the low-frequency torque component. When the target torque contains the low-frequency torque component and the high-frequency torque component, on the other hand, the control apparatus forms the target boost pressure by using the pressure component corresponding to the low-frequency torque component and a pressure component corresponding to a fixed torque component with a value equal to or more than a maximum amplitude of the high-frequency torque component. This allows the target boost pressure to be set to a high value not containing the high-frequency component, when the target torque contains a high-frequency vibration component, so that a transient shortage of boost pressure due to a shift in a time axis direction between the target boost pressure and the actual boost pressure can be avoided from occurring. The target torque can therefore be accurately achieved.

The following two preferable modes of processing are available for a specific process for forming the target boost pressure as described above. In a first mode of processing, when the target torque contains only the low-frequency torque component, the control apparatus determines the low-frequency torque component to be a boost pressure determining torque. When the target torque contains the low-frequency torque component and the high-frequency torque component, however, the high-frequency torque component is converted to a fixed torque component with a value equal to or more than a maximum amplitude of the high-frequency torque component, and a torque obtained by adding the fixed torque component to the low-frequency torque component is determined to be the boost pressure determining torque. The control apparatus then converts the boost pressure determining torque to a corresponding boost pressure according to a predetermined conversion rule and determines the boost pressure obtained through the conversion to be the target boost pressure.

In a second mode of processing, the control apparatus converts the target torque to a corresponding boost pressure (hereinafter referred to as a boost pressure converted value) according to a predetermined conversion rule. When the target torque contains only the low-frequency torque component, the boost pressure converted value is determined to be the target boost pressure. When the target torque contains the low-frequency torque component and the high-frequency torque component, a high-frequency pressure component of the boost pressure converted value corresponding to the high-frequency torque component is converted to a fixed pressure component with a value equal to or more than a maximum amplitude of the high-frequency pressure component. Then, a pressure value obtained by adding the fixed pressure component to a low-frequency pressure component of the boost pressure converted value corresponding to the low-frequency torque component is determined to be the target boost pressure.

In the control apparatus according to another embodiment of the present invention, when the target torque contains only the low-frequency torque component, the control apparatus forms the target boost pressure by using a pressure component corresponding to the low-frequency torque component. When the target torque contains the low-frequency torque component and the high-frequency torque component, on the other hand, the control apparatus forms the target boost pressure by using the pressure component corresponding to the low-frequency torque component and a pressure component corresponding to the high-frequency torque component delayed in a time axis direction. A delay time to delay the high-frequency torque component is to be set such that a sum of the delay time and a lag time in response in the actual boost pressure relative to an operation of the actuator for boost pressure control is an integer multiple of a cycle of the high-frequency torque component. When the target torque contains a high-frequency vibration component, the foregoing arrangement allows the actual boost pressure to be in phase with the vibration component, so that a transient shortage of boost pressure due to a shift in the time axis direction between the target boost pressure and the actual boost pressure can be avoided from occurring. The target torque can therefore be accurately achieved.

The following two preferable modes of processing are available for a specific process for forming the target boost pressure as described above. In a first mode of processing, when the target torque contains only the low-frequency torque component, the control apparatus determines the low-frequency torque component to be a boost pressure determining torque. When the target torque contains the low-frequency torque component and the high-frequency torque component, however, the high-frequency torque component is delayed by the abovementioned delay time, and a torque obtained by adding the delayed high-frequency torque component to the low-frequency torque component is determined to be the boost pressure determining torque. The control apparatus then converts the boost pressure determining torque to a corresponding boost pressure according to a predetermined conversion rule and determines the boost pressure obtained through the conversion to be the target boost pressure.

In a second mode of processing, the control apparatus converts the target torque to a corresponding boost pressure (hereinafter referred to as a boost pressure converted value) according to a predetermined conversion rule. When the target torque contains only the low-frequency torque component, the boost pressure converted value is determined to be the target boost pressure. If the target torque contains the low-frequency torque component and the high-frequency torque component, a high-frequency pressure component of the boost pressure converted value corresponding to the high-frequency torque component is delayed by the abovementioned delay time. Then, a pressure value obtained by adding a low-frequency pressure component of the boost pressure converted value corresponding to the low-frequency torque component to the delayed high-frequency pressure component is determined to be the target boost pressure. When the high-frequency pressure component obtained from the high-frequency torque component of the target torque has an excessively high frequency, the target boost pressure may not be achieved depending on performance of the actuator for boost pressure control. In such a case, the high-frequency pressure component is converted to a fixed pressure component with a value equal to or more than a maximum amplitude of the high-frequency pressure component and a pressure value obtained by adding the fixed pressure component to the low-frequency pressure component may be determined to be the target boost pressure.

MODES FOR CARRYING OUT THE INVENTION

First Embodiment

A first embodiment of the present invention will be described below with reference to FIGS. 1, 2, 3, and 4.

A supercharged internal combustion engine (hereinafter referred to as an engine) to be controlled in each of the embodiments of the present invention is a four-cycle reciprocating engine capable of controlling torque by adjusting an air quantity using a throttle. A supercharger disposed on the engine is a turbocharger that drives a compressor disposed in an intake path through rotation of a turbine disposed in an exhaust path. The turbocharger includes as an adjunct a waste gate valve (hereinafter referred to as a WGV) whose opening is adjustable. A control apparatus operates actuators included in the engine to thereby control operation of the engine. The actuators to be operated by the control apparatus include an ignition system, a throttle, a fuel injection system, a variable valve timing mechanism, and a WGV. The control apparatus according to the embodiment of the present invention operates the throttle that is an actuator for air quantity control and the WGV that is an actuator for boost pressure control. The control apparatus operates these two actuators to thereby control torque to be outputted by the engine.

Figure 1:
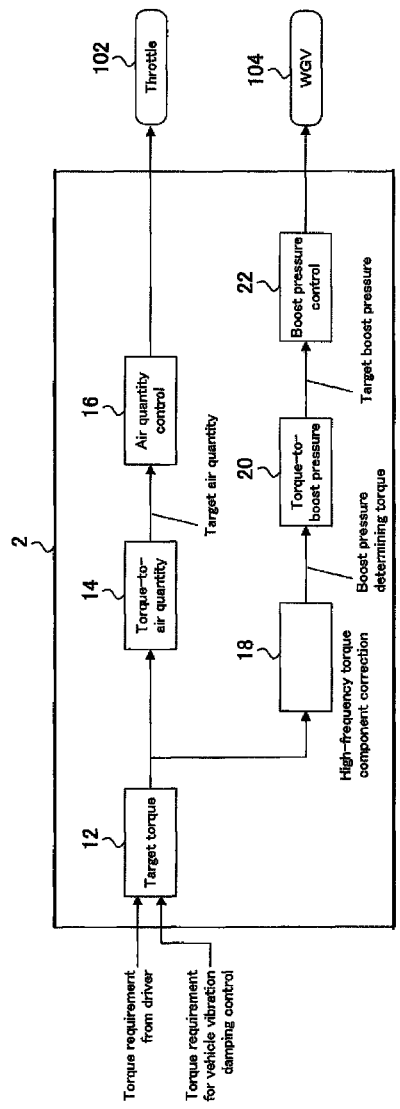
FIG. 1 is a block diagram showing an arrangement of a control apparatus for a supercharged internal combustion engine according to a first embodiment of the present invention.

A control apparatus 2 shown in the block diagram of FIG. 1 constitutes the control apparatus of this embodiment. In FIG. 1, elements 12, 14, 16, 18, 20, and 22 constituting the control apparatus 2 specially graphically represent, among various functional elements included in the control apparatus 2, only those elements relating to air quantity control achieved through an operation of a throttle 102 and boost pressure control achieved through an operation of a WGV 104. Accordingly, FIG. 1 should not to be construed to mean that the control apparatus 2 is formed to include only those elements. Note that each of these elements may be configured with a dedicated piece of hardware, or share the same hardware but be configured virtually with software. Arrangements of the control apparatus 2 will be described below with particular emphasis on the functions of each of the elements 12, 14, 16, 18, 20, and 22 shown in FIG. 1.

The control apparatus 2 receives inputs of torque requirements requested by the driver as represented by an accelerator operation amount and an operating speed. Torque requirements for vehicle control are also inputted from vehicle control devices such as a VSC and a TRC. A torque requirement for the vehicle vibration damping control performed to damp pitching vibration is also included herein. In order to facilitate easy understanding of characteristics of the present invention, the following description assumes that only the torque requirement from the driver and the torque requirement for the vehicle vibration damping control are inputted to the control apparatus 2.

Figure 2:
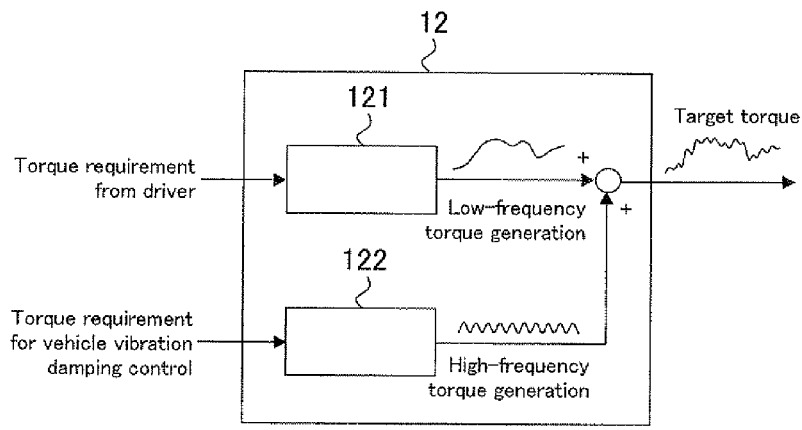
FIG. 2 is a block diagram showing an arrangement of a target torque determining unit of the control apparatus shown in FIG. 1.

Each of torque requirement signals inputted to the control apparatus 2 is processed by a target torque determining unit 12. The target torque determining unit 12 has a function of determining a target torque to be outputted to the engine based on each torque requirement. FIG. 2 is a block diagram showing an arrangement of the target torque determining unit 12. As shown in this figure, the target torque determining unit 12 includes a low-frequency torque component generating section 121 and a high-frequency torque component generating section 122. The low-frequency torque component generating section 121 generates a torque component for satisfying the torque requirement from the driver. The high-frequency torque component generating section 122, on the other hand, generates a torque component required for the vehicle vibration damping control. Whereas the torque component of the former is a low frequency, the torque component of the latter is a high frequency and there is a clear difference in frequency between the two. Another difference is that, while the low-frequency torque component is generated at all times as long as the vehicle is being driven, the high-frequency torque component is generated only in a situation in which pitching vibration is to occur. The target torque determining unit 12 outputs, as the target torque, torque that is obtained by adding the high-frequency torque component to the low-frequency torque component.

The control apparatus 2 determines a target air quantity from the target torque. For this purpose, the target torque outputted from the target torque determining unit 12 is inputted to a torque-to-air quantity converting unit 14. The torque-to-air quantity converting unit 14 uses a previously prepared conversion map to convert the target torque to a corresponding air quantity. As used herein, the term "air quantity" refers to the amount of air drawn into a cylinder. The conversion map correlates torque with the air quantity by using, as keys, various types of engine state quantities including an engine speed, on the assumption that ignition timing is an optimum ignition timing (MBT or trace knock ignition timing, whichever is more on a retarded side) and that an air-fuel ratio is a target air-fuel ratio (e.g., a stoichiometric ratio). The torque-to-air quantity converting unit 14 determines the air quantity required for achieving the target torque as the target air quantity of the engine.

The target air quantity is inputted to an air quantity control unit 16. The air quantity control unit 16 converts the target air quantity to a target throttle opening by using an inverse model of an air model. The air model is a physical model that models a response characteristic of the air quantity relative to a throttle operation. Use of the inverse model thereof therefore allows a throttle opening required for achieving the target air quantity to be calculated backward. In the inverse model of the air model, an actually measured or estimated actual boost pressure is used as a parameter. Accordingly, in the air quantity control unit 16, the throttle opening required for achieving the target air quantity under the actual boost pressure is calculated as the target throttle opening. The air quantity control unit 16 operates the throttle 102 according to the target throttle opening thus calculated.

While determining the target air quantity from the target torque, the control apparatus 2 concurrently determines a target boost pressure from the target torque. For determining the target boost pressure, a high-frequency torque component correcting unit 18 and a torque-to-boost pressure converting unit 20 are used. This embodiment is firstly characterized by a process of determining the target boost pressure from the target torque to be described in the following.

Figure 3:
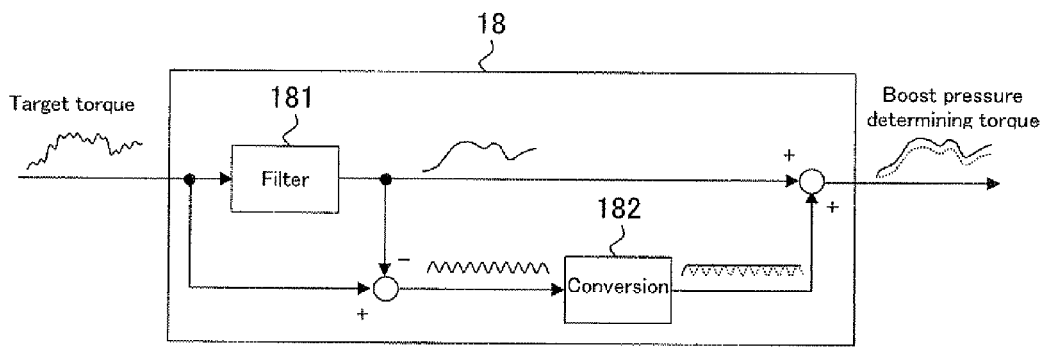
FIG. 3 is a block diagram showing an arrangement of a correcting unit of the control apparatus shown in FIG. 1.

FIG. 3 is a block diagram showing an arrangement of the high-frequency torque component correcting unit 18. The high-frequency torque component correcting unit 18 receives an input of the target torque outputted from the target torque determining unit 12. The target torque contains the low-frequency torque component as a basic component and additionally the high-frequency torque component when the vehicle vibration damping control is performed. The high-frequency torque component correcting unit 18 includes a low-pass filter 181 for removing a high-frequency torque component, if it is contained in the target torque, from the target torque. There is a clear difference in frequency between the high-frequency torque component and the low-frequency torque component that constitute the target torque. This allows the low-pass filter 181 to remove the high-frequency torque component and extract only the low-frequency torque component by letting the target torque pass through the low-pass filter 181. In addition, in the high-frequency torque component correcting unit 18, the low-frequency torque component is subtracted from an original target torque to thereby extract the high-frequency torque component contained in the target torque.

The high-frequency torque component extracted from the target torque is inputted to a converting section 182. The converting section 182 converts the high-frequency torque component to a fixed torque component having no vibration. Specifically, a value representing a maximum amplitude of the high-frequency torque component is acquired and a value obtained by multiplying the maximum amplitude of the high-frequency torque component by a predetermined coefficient is set as a fixed torque component. The maximum amplitude of the high-frequency torque component is read in the converting section 182 as known information when the vehicle vibration damping control is to be performed. The coefficient to be used for calculating the fixed torque component is 1 or any value more than 1 and a specific value is selected according to an operating mode of the engine. For example, the coefficient is set to 1 in an operating mode emphasizing fuel economy and set to a value greater than 1 in an operating mode emphasizing response.

The high-frequency torque component correcting unit 18 adds the fixed torque component obtained in the converting section 182 to the low-frequency torque component. A sum of the fixed torque component and the low-frequency torque component is then outputted as a boost pressure determining torque. It should be noted, however, that the boost pressure determining torque contains both the fixed torque component and the low-frequency torque component only when the vehicle vibration damping control is performed. Since the target torque contains only the low-frequency torque component when the vehicle vibration damping control is not performed, the low-frequency torque component is directly outputted as the boost pressure determining torque.

The torque-to-boost pressure converting unit 20 uses a previously prepared conversion map to convert the boost pressure determining torque to corresponding boost pressure. The conversion map maps measurements taken of a boost pressure required for achieving torque for each operating condition. The torque-to-boost pressure converting unit 20 determines the boost pressure required for achieving the boost pressure determining torque as the target boost pressure. If the boost pressure determining torque contains the low-frequency torque component only, the target boost pressure also contains a low-frequency pressure component only. If the boost pressure determining torque contains both the low-frequency torque component and the fixed torque component, the target boost pressure contains the low-frequency pressure component and a pressure component corresponding to the fixed torque component.

Figure 4:
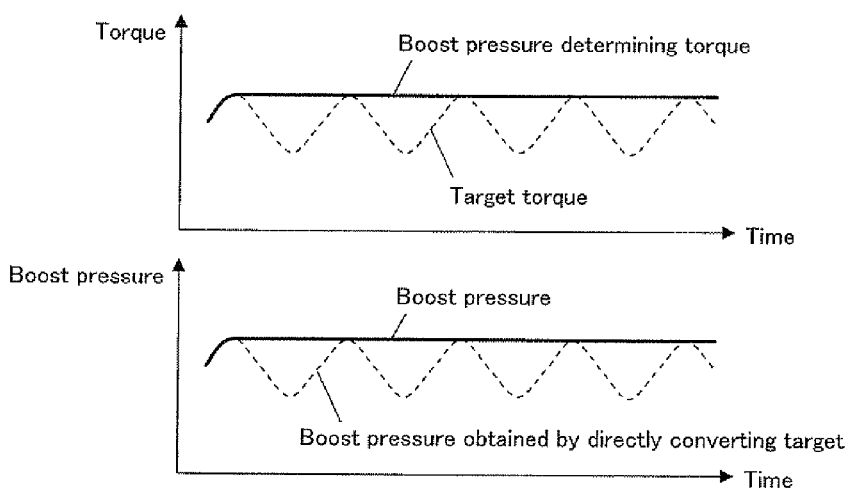
FIG. 4 is a graph for illustrating a process to determine a target boost pressure from a target torque performed in the first embodiment of the present invention.

FIG. 4 shows a specific process that determines the target boost pressure from the target torque and is performed in the control apparatus 2, being represented by graphs of the torque and the boost pressure. The two graphs share an identical time axis. Referring to the upper graph, when the target torque contains the high-frequency torque component, the boost pressure determining torque is set by replacing the high-frequency torque component with a fixed torque component having a value equal to or more than the maximum amplitude of the high-frequency torque component. In the control apparatus 2, the boost pressure determining torque is converted to a corresponding boost pressure by using the conversion map and the boost pressure thus obtained is determined as the target boost pressure. As a result, as shown in the lower graph, the target boost pressure does not contain the high-frequency pressure component and is set to be a value greater than a value required for achieving the target torque (the boost pressure obtained by directly converting the target torque indicated by a dotted line in the graph).

The target boost pressure determined through the foregoing process is inputted to a boost pressure control unit 22. The boost pressure control unit 22 calculates the opening of the WGV 104 required for achieving the target boost pressure as a target WGV opening. For calculation of the target WGV opening, various types of engine state quantities including an engine speed and load are used as parameters. The boost pressure control unit 22 operates the WGV 104 according to the target WGV opening thus calculated.

The actual boost pressure varies with a response lag relative to the operation of the WGV 104. In this case, if the target boost pressure is set as shown by a dotted line in the lower graph in FIG. 4, a transient shortage of boost pressure occurs due to a shift in the time axis direction between the target boost pressure and the actual boost pressure. However, with the control apparatus 2, when the target torque contains the high-frequency torque, the target boost pressure is set to a high value not containing the high-frequency component as shown by a solid line in the lower graph of FIG. 4. This allows the transient shortage of boost pressure to be avoided from occurring and the target torque including the high-frequency torque for vibration damping can be accurately achieved.

Second Embodiment

A second embodiment of the present invention will be described below with reference to FIGS. 5, 6, and 7.

Figure 5:
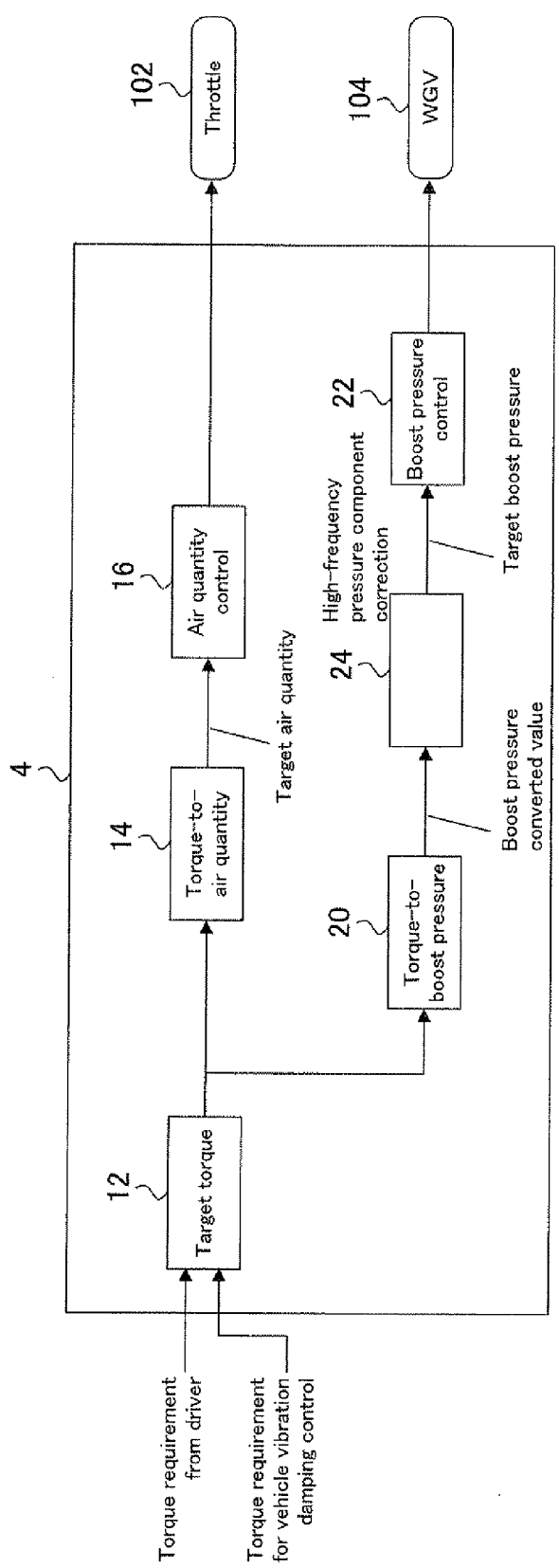
FIG. 5 is a block diagram showing an arrangement of a control apparatus for a supercharged internal combustion engine according to a second embodiment of the present invention.
Figure 6:
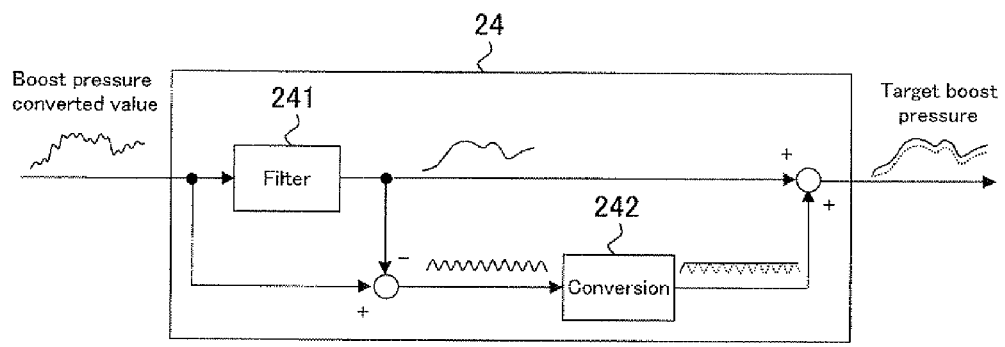
FIG. 6 is a block diagram showing an arrangement of a correcting unit of the control apparatus shown in FIG. 5.

A control apparatus 4 shown in a block diagram of FIG. 5 constitutes a control apparatus of this embodiment. The control apparatus 4 of this embodiment differs from the control apparatus 2 of the first embodiment in specific details of a process for determining the target boost pressure. The control apparatus 2 of the first embodiment uses the high-frequency torque component correcting unit 18 and the torque-to-boost pressure converting unit 20 to determine the target boost pressure. On the other hand, the control apparatus 4 of the second embodiment uses a torque-to-boost pressure converting unit 20 and a high-frequency pressure component correcting unit 24 to be described later to determine the target boost pressure.

In the control apparatus 4, a target torque outputted from a target torque determining unit 12 is, while being inputted to a torque-to-air quantity converting unit 14, concurrently inputted to the torque-to-boost pressure converting unit 20. The target torque inputted to the torque-to-boost pressure converting unit 20 is converted to a corresponding boost pressure according to the conversion map described earlier. A vibration component of the target torque is directly reflected in the boost pressure obtained through this conversion (hereinafter referred to as a boost pressure converted value). Specifically, if the target torque contains only the low-frequency torque component, the boost pressure converted value also contains only a low-frequency pressure component. On the other hand, if the target torque contains the low-frequency torque component and the high-frequency torque component, the boost pressure converted value also contains the low-frequency pressure component and the high-frequency pressure component.

The boost pressure converted value outputted from the torque-to-boost pressure converting unit 20 is inputted to the high-frequency pressure component correcting unit 24. FIG. 6 is a block diagram showing an arrangement of the high-frequency pressure component correcting unit 24. The high-frequency pressure component correcting unit 24 includes a low-pass filter 241 for removing from the boost pressure converted value a high-frequency pressure component if it is contained in the boost pressure converted value. The high-frequency pressure component has a frequency that is equal to a frequency of the high-frequency torque component constituting the target torque. The low-frequency pressure component has a frequency that is equal to a frequency of the low-frequency torque component constituting the target torque. Consequently, there is a clear difference in frequency between the high-frequency pressure component and the low-frequency pressure component. This allows the low-pass filter 241 to remove the high-frequency pressure component and extract only the low-frequency pressure component by letting the boost pressure converted value pass through the low-pass filter 241. In addition, in the high-frequency pressure component correcting unit 24, the low-frequency pressure component is subtracted from an original boost pressure converted value to thereby extract the high-frequency pressure component contained in the boost pressure converted value.

The high-frequency pressure component extracted from the boost pressure converted value is inputted to a converting section 242. The converting section 242 converts the high-frequency pressure component to a fixed pressure component having no vibration. Specifically, a maximum amplitude of the high-frequency pressure component is acquired from a maximum amplitude of the high-frequency torque component and a value obtained by multiplying the maximum amplitude of the high-frequency pressure component by a predetermined coefficient is set as a fixed pressure component. The coefficient to be used for calculating the fixed pressure component is 1 or any value more than 1 and a specific value is selected according to an operating mode of the engine. For example, the coefficient is set to 1 in an operating mode emphasizing fuel economy and set to a value greater than 1 in an operating mode emphasizing response.

The high-frequency pressure component correcting unit 24 adds the fixed pressure component obtained in the converting section 242 to the low-frequency pressure component and outputs a resultant pressure value as the target boost pressure. It should be noted, however, that the target boost pressure contains both the fixed pressure component and the low-frequency pressure component only when the vehicle vibration damping control is performed. Since the target torque contains only the low-frequency torque component when the vehicle vibration damping control is not performed, the low-frequency pressure component converted from the low-frequency torque component is directly outputted as the target boost pressure.

Figure 7:
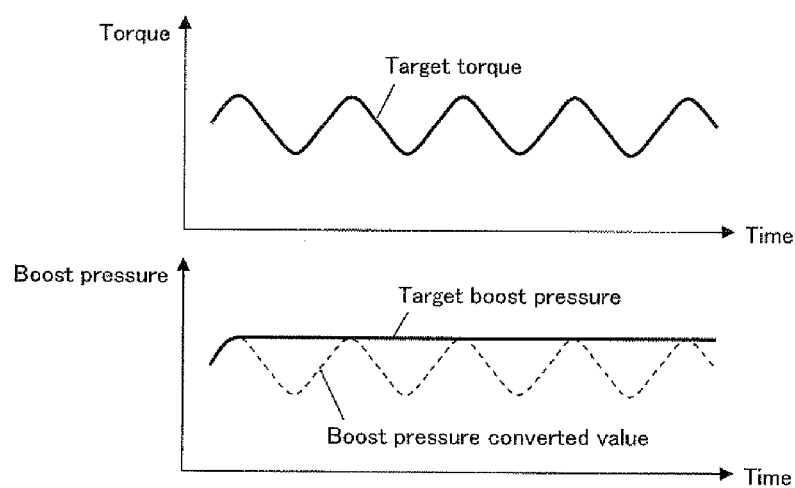
FIG. 7 is a graph for illustrating a process to determine a target boost pressure from a target torque performed in the second embodiment of the present invention.

FIG. 7 shows a specific process that determines the target boost pressure from the target torque and is performed in the control apparatus 4, being represented by graphs of the torque and the boost pressure. The two graphs share an identical time axis. In this embodiment, the target torque is directly converted to a corresponding boost pressure through the conversion map. Therefore, when the target torque contains the high-frequency torque component as shown in the upper graph, a boost pressure converted value containing the high-frequency pressure component as shown by a dotted line in the lower graph is obtained. The high-frequency pressure component of this boost pressure converted value is replaced by a fixed pressure component with a value equal to or more than the maximum amplitude of the high-frequency pressure component, and the value thus obtained is set as the target boost pressure. As a result, as shown in the lower graph, the target boost pressure does not contain the high-frequency pressure component and is set to be a value greater than the boost pressure converted value obtained by directly converting the target torque.

As described above, in the control apparatus 4, when the target torque contains the high-frequency torque, the target boost pressure is set to a high value not containing the high-frequency component, in the same manner as in the control apparatus 2 of the first embodiment. This allows the transient shortage of boost pressure due to a shift in the time axis direction between the target boost pressure and the actual boost pressure to be avoided from occurring and the target torque including the high-frequency torque for vibration damping can be accurately achieved.

Third Embodiment

A third embodiment of the present invention will be described below with reference to FIGS. 8, 9, and 10.

Figure 8:
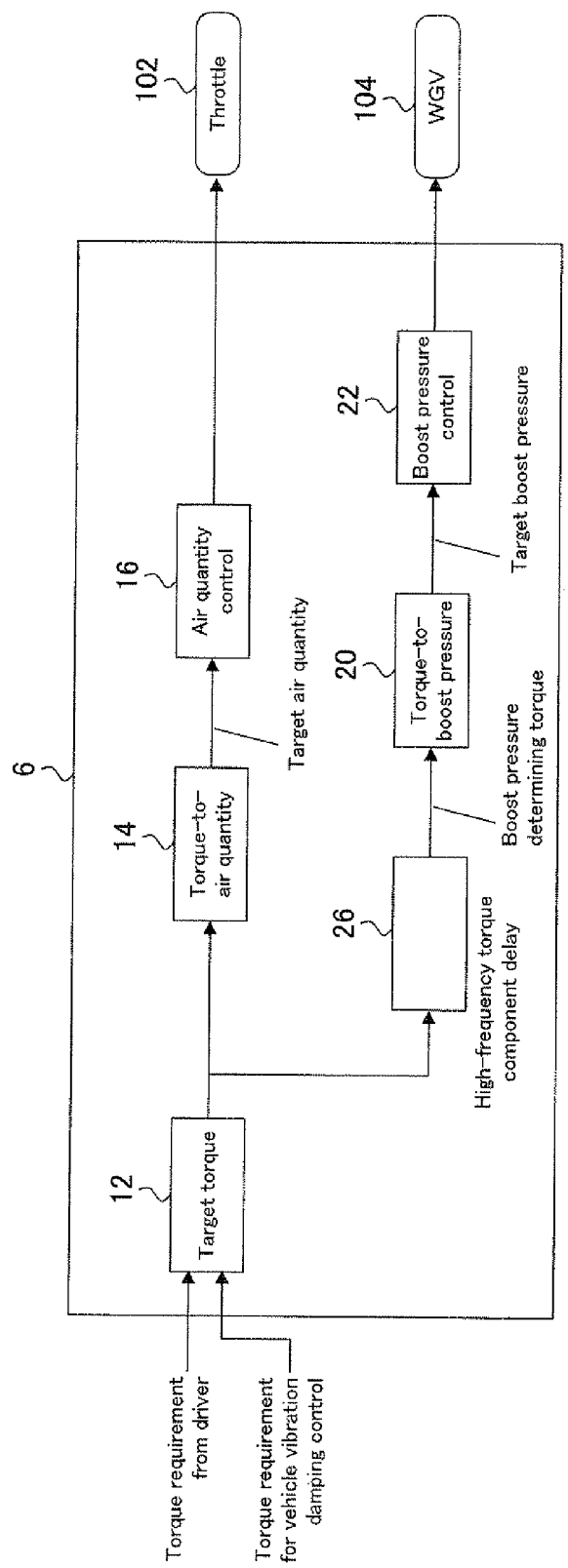
FIG. 8 is a block diagram showing an arrangement of a control apparatus for a supercharged internal combustion engine according to a third embodiment of the present invention.
Figure 9:
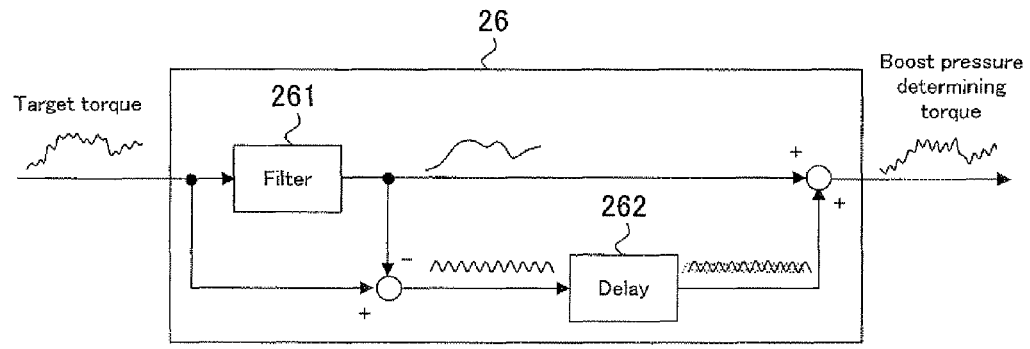
FIG. 9 is a block diagram showing an arrangement of a delay unit of the control apparatus shown in FIG. 8.

A control apparatus 6 shown in a block diagram of FIG. 8 constitutes a control apparatus of this embodiment. The control apparatus 6 of this embodiment differs from the control apparatus 2 of the first embodiment in specific details of a process for determining the target boost pressure. In the control apparatus 6 of this embodiment, a high-frequency torque component delay unit 26 and a torque-to-boost pressure converting unit 20 are used to determine the target boost pressure.

In the control apparatus 6, a target torque outputted from a target torque determining unit 12 is, while being inputted to a torque-to-air quantity converting unit 14, concurrently inputted to the high-frequency torque component delay unit 26. FIG. 9 is a block diagram showing an arrangement of the high-frequency torque component delay unit 26. The high-frequency torque component delay unit 26 includes a low-pass filter 261 for removing from the target torque a high-frequency torque component when it is contained in the target torque. In addition, in the high-frequency torque component delay unit 26, the low-frequency torque component is subtracted from an original target torque to thereby extract the high-frequency torque component contained in the target torque.

The high-frequency torque component extracted from the target torque is inputted to a delay circuit 262. The delay circuit 262 introduces delay in the time axis direction to the high-frequency torque component inputted thereto before outputting. A delay time to delay the high-frequency torque component in the delay circuit 262 is set such that a sum of the delay time and a lag time in response in the actual boost pressure relative to an operation of the WGV 104 is an integer multiple of a cycle of the high-frequency torque component. Effects of setting such a delay time will be described later. Since the lag time in response depends also on engine operating conditions such as an engine speed, the delay time setting is changed as necessary in the delay circuit 262 according to the engine operating conditions.

The high-frequency torque component delay unit 26 adds the high-frequency torque component delayed in the delay circuit 262 to the low-frequency torque component. The sum of the low-frequency torque component and the delayed high-frequency torque component is then outputted as the boost pressure determining torque. Since the target torque contains only the low-frequency torque component when the vehicle vibration damping control is not performed, the low-frequency torque component is directly determined as the boost pressure determining torque.

The boost pressure determining torque obtained in the high-frequency torque component delay unit 26 is inputted to the torque-to-boost pressure converting unit 20. The boost pressure determining torque inputted to the torque-to-boost pressure converting unit 20 is converted to a corresponding boost pressure through the abovementioned conversion map. The boost pressure converted from the boost pressure determining torque is determined as the target boost pressure. If the boost pressure determining torque contains only the low-frequency torque component, the target boost pressure also contains only a low-frequency pressure component. On the other hand, if the boost pressure determining torque contains the low-frequency torque component and the high-frequency torque component, the target boost pressure also contains the low-frequency pressure component and the high-frequency pressure component.

Figure 10:
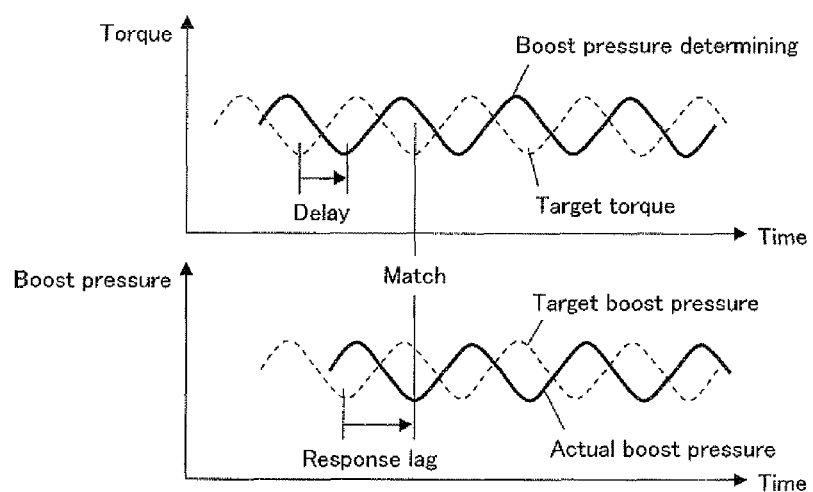
FIG. 10 is a graph for illustrating a process to determine a target boost pressure from a target torque performed in the third embodiment of the present invention.

FIG. 10 shows a specific process that determines the target boost pressure from the target torque and is performed in the control apparatus 6, being represented by graphs of the torque and the boost pressure. The two graphs share an identical time axis. As shown in the upper graph, when the target torque contains the high-frequency torque component, the high-frequency torque component delayed in the time axis direction is set as the boost pressure determining torque. In the control apparatus 6, this boost pressure determining torque is converted to a corresponding boost pressure through the conversion map and the boost pressure obtained through the conversion is determined as the target boost pressure. As a result, the target boost pressure is delayed relative to the target torque as shown in the lower graph. However, as described earlier, the sum of the delay time to delay the high-frequency torque component and the lag time in response in the actual boost pressure relative to the operation of the WGV 104 is an integer multiple of the cycle of the high-frequency torque component. As a result, the actual boost pressure achieved through the operation of the WGV 104 based on the target boost pressure (indicated by a solid line in the lower graph) is in phase with the high-frequency torque contained in the target torque.

As such, in the control apparatus 6, when the target torque contains the high-frequency torque, the actual boost pressure is brought into phase with the high-frequency torque. This allows the transient shortage of boost pressure due to a shift in the time axis direction between the target boost pressure and the actual boost pressure to be avoided from occurring and the target torque including the high-frequency torque for vibration damping can be accurately achieved. In addition, in the control apparatus 6, the actual boost pressure can assume an optimum value according to the target torque, so that throttling by the throttle 102 can be held to a minimum. This achieves an effect of preventing fuel efficiency from being aggravated by minimizing pump loss.

Fourth Embodiment

A fourth embodiment of the present invention will be described below with reference to FIGS. 11, 12, and 13.

Figure 11:
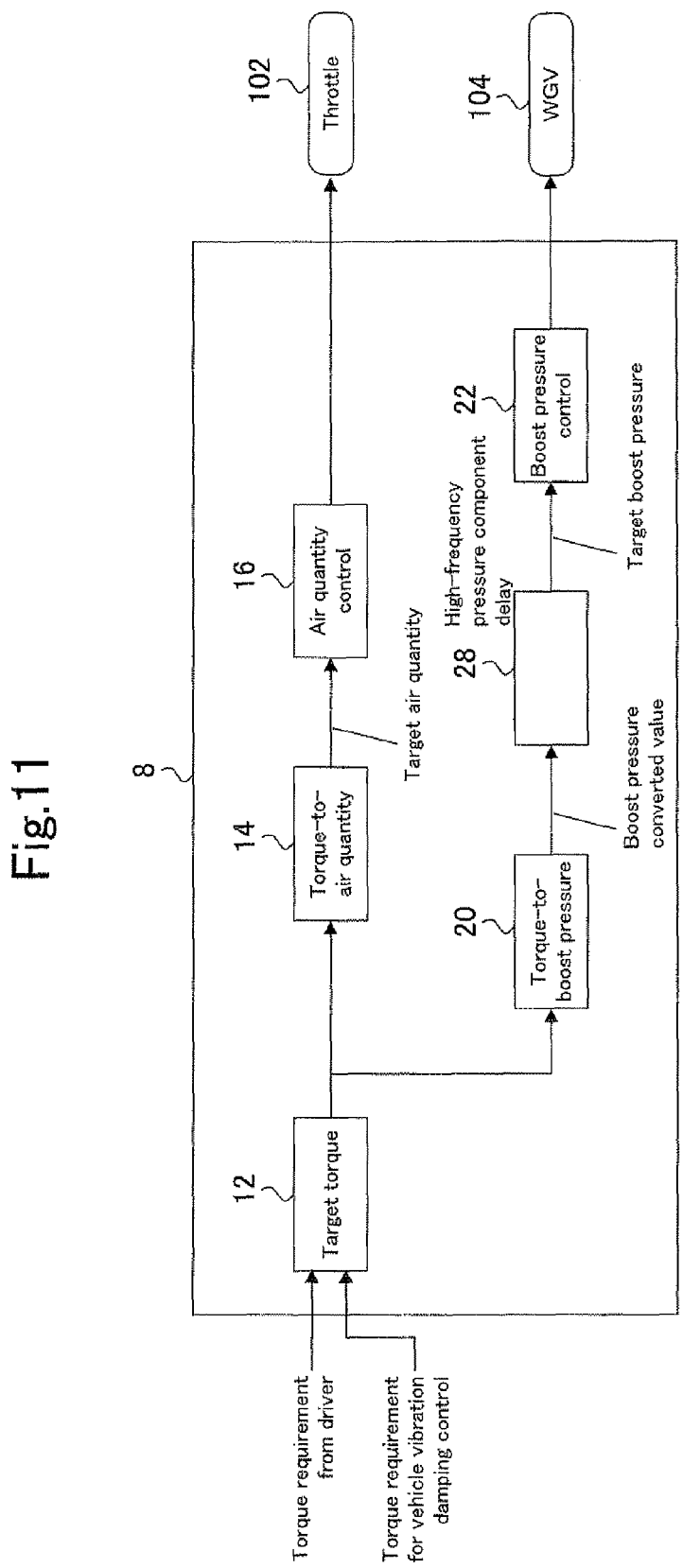
FIG. 11 is a block diagram showing an arrangement of a control apparatus for a supercharged internal combustion engine according to a fourth embodiment of the present invention.
Figure 12:
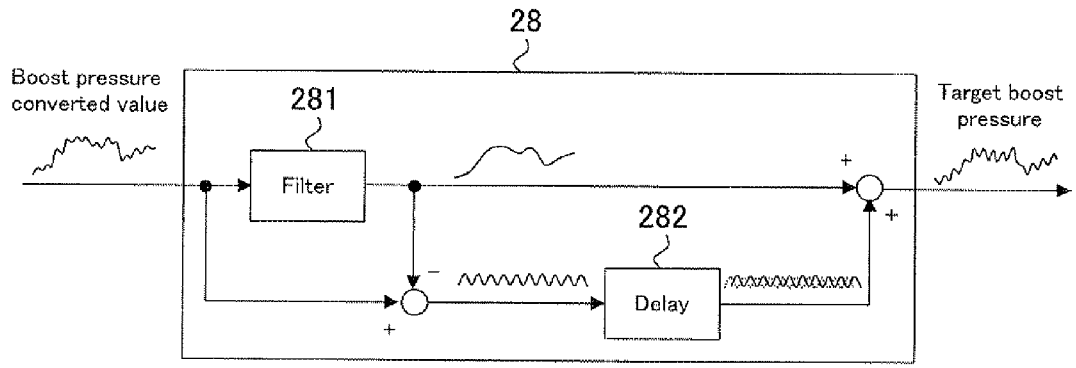
FIG. 12 is a block diagram showing an arrangement of a delay unit of the control apparatus shown in FIG. 11.

A control apparatus 8 shown in a block diagram of FIG. 11 constitutes a control apparatus of this embodiment. When the target torque contains the low-frequency torque component and the high-frequency torque component, the control apparatus 8 of this embodiment forms the target boost pressure by using a pressure component corresponding to the low-frequency torque component and a pressure component corresponding to the high-frequency torque component delayed in the time axis direction, as in the control apparatus 6 of the third embodiment. However, the control apparatus 8 of this embodiment differs from the control apparatus 6 of the third embodiment in specific details of a process for determining the target boost pressure. In the control apparatus 8 of this embodiment, a torque-to-boost pressure converting unit 20 and a high-frequency pressure component delay unit 28 are used to determine the target boost pressure.

In the control apparatus 8, a target torque outputted from a target torque determining unit 12 is, while being inputted to a torque-to-air quantity converting unit 14, concurrently inputted to the torque-to-boost pressure converting unit 20. The target torque inputted to the torque-to-boost pressure converting unit 20 is converted to a corresponding boost pressure according to the conversion map described earlier. A vibration component of the target torque is directly reflected in the boost pressure obtained through this conversion (hereinafter referred to as a boost pressure converted value). Specifically, if the target torque contains only the low-frequency torque component, the boost pressure converted value also contains only a low-frequency pressure component. On the other hand, if the target torque contains the low-frequency torque component and the high-frequency torque component, the boost pressure converted value also contains the low-frequency pressure component and the high-frequency pressure component.

The boost pressure converted value outputted from the torque-to-boost pressure converting unit 20 is inputted to the high-frequency pressure component delay unit 28. FIG. 12 is a block diagram showing an arrangement of the high-frequency pressure component delay unit 28. The high-frequency pressure component delay unit 28 includes a low-pass filter 281 for removing from the boost pressure converted value a high-frequency pressure component when it is contained in the boost pressure converted value. Letting the boost pressure converted value pass through the low-pass filter 281 removes the high-frequency pressure component and extracts only the low-frequency pressure component. In addition, in the high-frequency pressure component delay unit 28, the low-frequency pressure component is subtracted from an original boost pressure converted value to thereby extract the high-frequency pressure component contained in the boost pressure converted value.

The high-frequency pressure component thus extracted is inputted to a delay circuit 282. The delay circuit 282 introduces delay in the time axis direction to the high-frequency pressure component inputted thereto before outputting. A delay time to delay the high-frequency pressure component in the delay circuit 282 is set such that a sum of the delay time and a lag time in response in the actual boost pressure relative to an operation of the WGV 104 is an integer multiple of a cycle of the high-frequency torque component. Since the lag time in response depends also on engine operating conditions such as the engine speed, the delay time setting is changed as necessary in the delay circuit 282 according to the engine operating conditions.

The high-frequency pressure component delay unit 28 adds the high-frequency pressure component delayed in the delay circuit 282 to the low-frequency pressure component and the resultant sum is then outputted as the target boost pressure. Since the target torque contains only the low-frequency torque component when the vehicle vibration damping control is not performed, the low-frequency pressure component converted from the low-frequency torque component is directly outputted as the target boost pressure.

Figure 13:
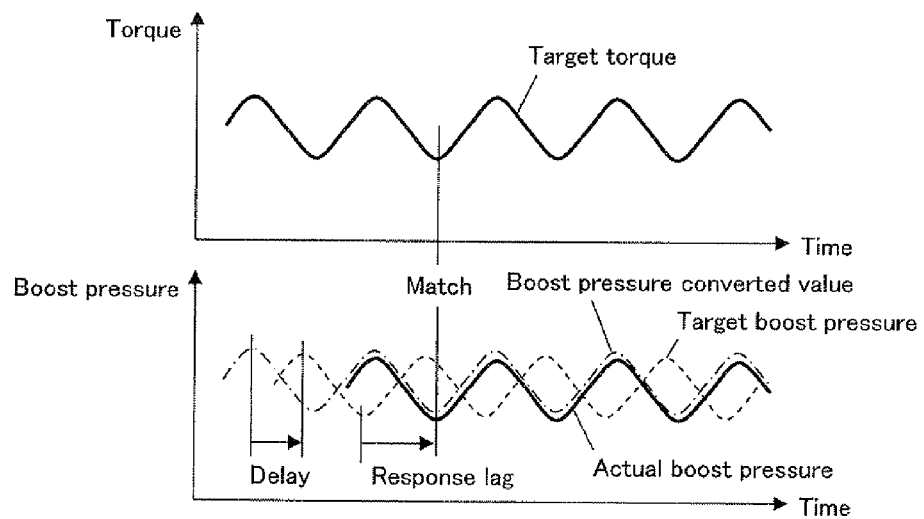
FIG. 13 is a graph for illustrating a process to determine a target boost pressure from a target torque performed in the fourth embodiment of the present invention.

FIG. 13 shows a specific process that determines the target boost pressure from the target torque and is performed in the control apparatus 8, being represented by graphs of the torque and the boost pressure. The two graphs share an identical time axis. In this embodiment, the target torque is directly converted to a corresponding boost pressure by using the conversion map. Thus, when the target torque contains the high-frequency torque component as shown in the upper graph, a boost pressure converted value containing the high-frequency pressure component is obtained as shown by a dash-single-dot line in the lower graph. In the control apparatus 8, the boost pressure converted value of which the high-frequency pressure component is delayed in the time axis direction is determined as the target boost pressure. This results in the target boost pressure being delayed relative to the target torque as shown by a solid line in the lower graph. The sum of the delay time to delay the high-frequency pressure component and the lag time in response in the actual boost pressure relative to the operation of the WGV 104 is an integer multiple of the cycle of the high-frequency torque component. As a result, the actual boost pressure achieved through the operation of the WGV 104 based on the target boost pressure (indicated by the solid line in the lower graph) is in phase with the high-frequency torque contained in the target torque.

As such, in the control apparatus 8, when the target torque contains the high-frequency torque, the actual boost pressure is brought into phase with the high-frequency torque, as in the control apparatus 6 of the third embodiment. This allows the transient shortage of boost pressure due to a shift in the time axis direction between the target boost pressure and the actual boost pressure to be avoided from occurring and the target torque including the high-frequency torque for vibration damping can be accurately achieved. In addition, the actual boost pressure can assume an optimum value according to the target torque. This prevents fuel efficiency from being aggravated by minimizing pump loss.

Fifth Embodiment

A fifth embodiment of the present invention will be described below with reference to FIG. 14.

A control apparatus according to this embodiment is based on the control apparatus 8 of the fourth embodiment. However, the control apparatus according to this embodiment includes, as means for determining the target boost pressure from the boost pressure converted value, the high-frequency pressure component correcting unit 24 of the second embodiment, in addition to the high-frequency pressure component delay unit 28 of the fourth embodiment. These two elements 24, 28 are selectively used as appropriately according to a flow chart of FIG. 14.

Figure 14:
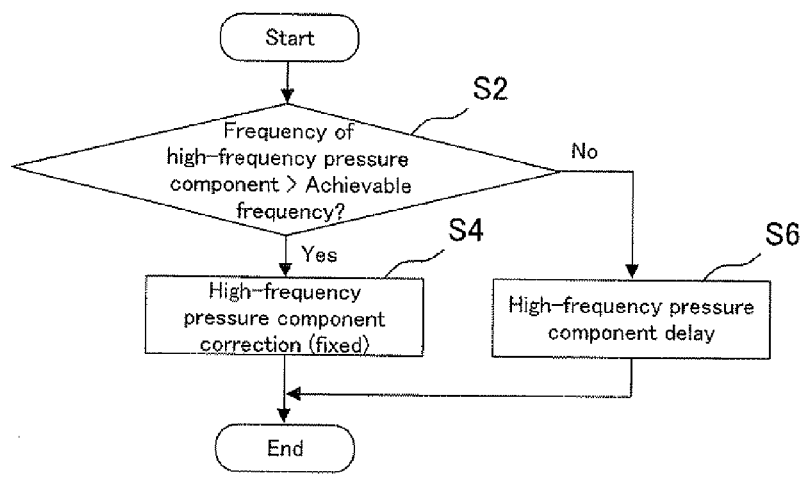
FIG. 14 is a flow chart for illustrating a process to determine a target boost pressure from a target torque performed in the fifth embodiment of the present invention.
Figure 15:
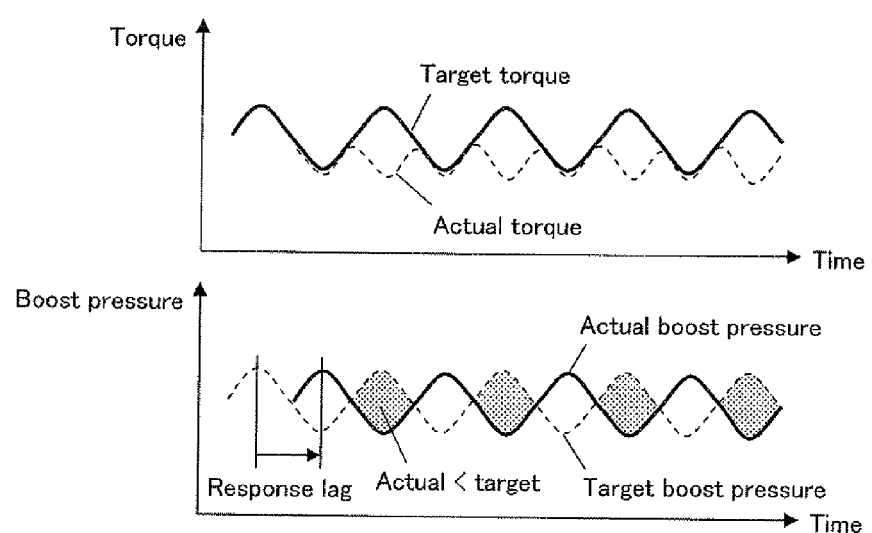
FIG. 15 is a graph for illustrating a problem that arises when vehicle vibration damping control is performed in an internal combustion engine capable of actively controlling a boost pressure according to a target torque.

According to the flow chart of FIG. 14, in step S2, it is determined whether the frequency of the high-frequency pressure component contained in the boost pressure converted value is achievable. Response performance of the WGV 104 imposes a limit on the frequency of the boost pressure to be achieved. Measurements previously taken of a maximum frequency that can be achieved for each operating condition of the engine are used in determination made in step S2.

When the frequency of the high-frequency pressure component is equal to or less than the achievable frequency, a process of step S6 is performed for determining the target boost pressure. In step S6, the high-frequency pressure component delay unit 28 of the fourth embodiment is used to determine the high-frequency pressure component of the boost pressure converted value delayed in the time axis direction as the target boost pressure. Specifically, in this case, the target boost pressure is vibrated at a frequency corresponding to the high-frequency torque component contained in the target torque. This allows the actual boost pressure to assume an optimum value according to the target torque. This prevents fuel efficiency from being aggravated by minimizing pump loss.

In contrast, when the frequency of the high-frequency pressure component exceeds the achievable frequency, a process of step S4 is performed for determining the target boost pressure. In step S4, the high-frequency pressure component correcting unit 24 of the second embodiment is used to determine the target boost pressure by replacing the high-frequency pressure component of the boost pressure converted value with a fixed pressure component having a value equal to or more than the maximum amplitude of the high-frequency pressure component. Specifically, in this case, the target boost pressure is stopped from being vibrated at high frequency. This prevents the following situation in which the actual boost pressure fails to follow the target torque frequency and, as a result, there is a transient shortage of boost pressure.

Miscellaneous

The present invention is not limited to the aforementioned embodiments, and can be carried out by being variously modified in the range without departing from the gist of the present invention. For example, in the above-described embodiment, the actual boost pressure is used as boost pressure information for calculating the throttle opening; the target boost pressure may nonetheless be used as the boost pressure information. Considering a turbo lag in a transient state, however, preferably the actual boost pressure is used as in the above-described embodiment.

For the actuator for air quantity control, a variable valve lift mechanism of an intake valve may also be used, in addition to the throttle. For the actuator for boost pressure control, an air bypass valve, an electric motor for assisting in rotation of a compressor, or a variable nozzle of a turbine may be used, in addition to the WGV.

Additionally, a mechanical supercharger that drives a compressor with torque taken off from an output shaft of an engine may be used for the supercharger disposed on the engine. In this case, an air bypass valve may, for example, be used for the actuator for boost pressure control.

DESCRIPTION OF REFERENCE NUMERALS 2, 4, 6, 8 Control apparatus
12 Target torque determining unit
14 Torque-to-air quantity converting unit
16 Air quantity control unit
18 High-frequency torque component correcting unit
20 Torque-to-boost pressure converting unit
22 Boost pressure control unit
24 High-frequency pressure component correcting unit
26 High-frequency torque component delay unit
28 High-frequency pressure component delay unit
102 Throttle
104 Waste gate valve

The invention claimed is:

1. A control apparatus for a supercharged internal combustion engine, comprising:
   means for determining a target torque to be outputted to the supercharged internal combustion engine;
   means for determining a target air quantity from the target torque;
   means for determining a target boost pressure from the target torque;
   means for controlling an operation of an actuator for air quantity control according to the target air quantity; and
   means for controlling an operation of an actuator for boost pressure control according to the target boost pressure, wherein:
   the target torque determining means forms the target torque by using a low-frequency torque component set at all times based on a torque requirement from a driver and a high-frequency torque component set as necessary for a specific type of vehicle control; and
   when the target torque contains only the low-frequency torque component, the target boost pressure determining means forms the target boost pressure by using a pressure component corresponding to the low-frequency torque component and,
   when the target torque contains the low-frequency torque component and the high-frequency torque component, the target boost pressure determining means forms the target boost pressure by using the pressure component corresponding to the low-frequency torque component and a pressure component corresponding to a fixed torque component with a value equal to or more than a maximum amplitude of the high-frequency torque component.

2. The control apparatus for a supercharged internal combustion engine according to claim 1, wherein:
   the target boost pressure determining means comprises:
   means for determining the low-frequency torque component as a boost pressure determining torque, when the target torque contains only the low-frequency torque component;
   means for determining, as a boost pressure determining torque, a torque obtained by converting the high-frequency torque component to a corresponding fixed torque component with a value equal to or more than a maximum amplitude of the high-frequency torque component and adding the fixed torque component to the low-frequency torque component, when the target torque contains the low-frequency torque component and the high-frequency torque component; and
   means for determining, as the target boost pressure, a boost pressure obtained by converting the boost pressure determining torque according to a predetermined conversion rule.

3. The control apparatus for a supercharged internal combustion engine according to claim 1, wherein:
   the target boost pressure determining means comprises:
   means for converting the target torque to a corresponding boost pressure (hereinafter referred to as a boost pressure converted value) according to a predetermined conversion rule;
   means for determining the boost pressure converted value as the target boost pressure, when the target torque contains only the low-frequency torque component; and
   means for determining, as the target boost pressure, a pressure value obtained by converting a high-frequency pressure component of the boost pressure converted value corresponding to the high-frequency torque component to a fixed pressure component with a value equal to or more than a maximum amplitude of the high-frequency pressure component and adding the fixed pressure component to a low-frequency pressure component of the boost pressure converted value corresponding to the low-frequency torque component, when the target torque contains the low-frequency torque component and the high-frequency torque component.

4. A control apparatus for a supercharged internal combustion engine, comprising:

means for determining a target torque to be outputted to the supercharged internal combustion engine;

means for determining a target air quantity from the target torque;

means for determining a target boost pressure from the target torque;

means for controlling an operation of an actuator for air quantity control according to the target air quantity; and means for controlling an operation of an actuator for boost pressure control according to the target boost pressure, wherein:

the target torque determining means forms the target torque by using a low-frequency torque component set at all times based on a torque requirement from a driver and a high-frequency torque component set as necessary for a specific type of vehicle control; and when the target torque contains only the low-frequency torque component, the target boost pressure determining means forms the target boost pressure by using a pressure component corresponding to the low-frequency torque component and, when the target torque contains the low-frequency torque component and the high-frequency torque component, the target boost pressure determining means forms the target boost pressure by using the pressure component corresponding to the low-frequency torque component and a pressure component corresponding to the high-frequency torque component delayed in a time axis direction; and the target boost pressure determining means sets a delay time such that a sum of the delay time to delay the high-frequency torque component and a lag time in response in an actual boost pressure relative to an operation of the actuator for boost pressure control is an integer multiple of a cycle of the high-frequency torque component.

5. The control apparatus for a supercharged internal combustion engine according to claim 4, wherein:

the target boost pressure determining means comprises:

means for determining the low-frequency torque component as a boost pressure determining torque, when the target torque contains only the low-frequency torque component;

means for determining, as a boost pressure determining torque, a torque obtained by introducing delay for the delay time to the high-frequency torque component and adding the delayed high-frequency torque component to the low-frequency torque component, when the target torque contains the low-frequency torque component and the high-frequency torque component; and means for determining, as the target boost pressure, a boost pressure obtained by converting the boost pressure determining torque according to a predetermined conversion rule.

6. The control apparatus for a supercharged internal combustion engine according to claim 4, wherein:

the target boost pressure determining means comprises:

means for converting the target torque to a corresponding boost pressure (hereinafter referred to as a boost pressure converted value) according to a predetermined conversion rule;

means for determining the boost pressure converted value as the target boost pressure, when the target torque contains only the low-frequency torque component; and means for determining, as the target boost pressure, a pressure value obtained by introducing delay for the delay time to a high-frequency pressure component of the boost pressure converted value corresponding to the high-frequency torque component and adding the delayed high-frequency pressure component to a low-frequency pressure component of the boost pressure converted value corresponding to the low-frequency torque component, when the target torque contains the low-frequency torque component and the high-frequency torque component.

7. The control apparatus for a supercharged internal combustion engine according to claim 6, wherein:

the target boost pressure determining means further comprises:

means for determining whether the high-frequency pressure component has a frequency that is achievable by the actuator for boost pressure control; and means for determining, as the target boost pressure, a pressure value obtained by converting the high-frequency pressure component to a fixed pressure component with a value equal to or more than a maximum amplitude of the high-frequency pressure component and adding the fixed pressure component to the low-frequency pressure component, when the frequency of the high-frequency pressure component exceeds the achievable frequency.

8. A control apparatus for a supercharged internal combustion engine, comprising:

an actuator for air quantity control;

an actuator for boost pressure control; and a controller that is programmed to:

determine a target torque to be outputted to the supercharged internal combustion engine;

determine a target air quantity from the target torque;

determine a target boost pressure from the target torque;

control an operation of the actuator for air quantity control according to the target air quantity; and control an operation of the actuator for boost pressure control according to the target boost pressure, wherein:

the controller forms the target torque by using a low-frequency torque component set at all times based on a torque requirement from a driver and a high-frequency torque component set as necessary for a specific type of vehicle control; and the controller forms the target boost pressure by using a pressure component corresponding to the low-frequency torque component when the target torque contains only the low-frequency torque component, and forms the target boost pressure by using the pressure component corresponding to the low-frequency torque component and a pressure component corresponding to a fixed torque component with a value equal to or more than a maximum amplitude of the high-frequency torque component when the target torque contains the low-frequency torque component and the high-frequency torque component.

9. A control apparatus for a supercharged internal combustion engine, comprising:

an actuator for air quantity control;

an actuator for boost pressure control; and a controller that is programmed to:

determine a target torque to be outputted to the supercharged internal combustion engine;

determine a target air quantity from the target torque;

determine a target boost pressure from the target torque;

control an operation of the actuator for air quantity control according to the target air quantity; and control an operation of the actuator for boost pressure control according to the target boost pressure, wherein:

the controller forms the target torque by using a low-frequency torque component set at all times based on a torque requirement from a driver and a high-frequency torque component set as necessary for a specific type of vehicle control; and the controller forms the target boost pressure by using a pressure component corresponding to the low-frequency torque component when the target torque contains only the low-frequency torque component, and forms the target boost pressure by using the pressure component corresponding to the low-frequency torque component and a pressure component corresponding to the high-frequency torque component delayed in a time axis direction when the target torque contains the low-frequency torque component and the high-frequency torque component, and the controller sets a delay time such that a sum of the delay time to delay the high-frequency torque component and a lag time in response in an actual boost pressure relative to an operation of the actuator for boost pressure control is an integer multiple of a cycle of the high-frequency torque component.

\* \* \* \* \*